(12) United States Patent
Sfez

(10) Patent No.: US 12,044,906 B2
(45) Date of Patent: Jul. 23, 2024

(54) BROADBAND FARADAY ROTATOR

(71) Applicant: Soreq Nuclear Research Center, Yavne (IL)

(72) Inventor: Bruno Sfez, Jerusalem (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 651 days.

(21) Appl. No.: 17/283,556

(22) PCT Filed: Oct. 8, 2019

(86) PCT No.: PCT/IB2019/058537
§ 371 (c)(1),
(2) Date: Apr. 8, 2021

(87) PCT Pub. No.: WO2020/075048
PCT Pub. Date: Apr. 16, 2020

(65) Prior Publication Data
US 2021/0389611 A1    Dec. 16, 2021

Related U.S. Application Data

(60) Provisional application No. 62/742,945, filed on Oct. 9, 2018.

(51) Int. Cl.
*G02F 1/01* (2006.01)
*G02F 1/09* (2006.01)

(52) U.S. Cl.
CPC ............ *G02F 1/0136* (2013.01); *G02F 1/093* (2013.01)

(58) Field of Classification Search
CPC .......... G02F 1/0136; G02F 1/093; G02F 1/09; G02F 1/0955; G02F 1/0036; G02F 2203/04; G02B 6/2746; G02B 6/4208; G02B 27/28; G02B 27/286
See application file for complete search history.

(56) References Cited

U.S. PATENT DOCUMENTS

| 5,712,728 A | * | 1/1998 | Chen | ................. G02B 27/283 |
| | | | | 359/489.05 |
| 6,532,316 B1 | | 3/2003 | Cao | |
| 6,563,977 B1 | * | 5/2003 | Chen | .................. G02B 6/29397 |
| | | | | 398/43 |

(Continued)

FOREIGN PATENT DOCUMENTS

| CN | 104635347 | 5/2015 |
| CN | 106980156 | 7/2017 |

OTHER PUBLICATIONS

PCT Search Report and Written Opinion PCT/IB2019/058537, Mar. 9, 2020.

*Primary Examiner* — Stephone B Allen
*Assistant Examiner* — Adam W Booher
(74) *Attorney, Agent, or Firm* — Dekel Patent Ltd.; David Klein

(57) ABSTRACT

An apparatus includes a dispersive-collimating element, a Faraday material apparatus and a focusing-dispersive element. The dispersive-collimating element assigns each beam wavelength to a particular spatial position. The beams are parallel one to the other. The Faraday material apparatus provides a polarization rotation independently for each wavelength, and the focusing-dispersive element recombines the different wavelengths into one single beam.

6 Claims, 6 Drawing Sheets

(56) References Cited

U.S. PATENT DOCUMENTS

2001/0040723 A1\* 11/2001 Kusaka ................. G02B 21/14
                                                   359/370
2005/0036202 A1\* 2/2005 Cohen .................... G02B 6/272
                                                   359/489.05

\* cited by examiner

BROADBAND FARADAY ROTATOR

FIELD OF THE INVENTION

The invention relates to an ultra-broadband, low-cost Faraday rotator.

BACKGROUND OF THE INVENTION

There is an increased need for broadband Faraday rotators, in particular in the field of femtosecond and sub-femtosecond lasers, which manipulate a broadband light source. Essentially the Faraday rotator is extremely wavelength dependent and therefore is usually available for a very limited wavelength range. Achromatic Faraday rotators are usually obtained through a complex and expensive combination of chromatic Faraday rotator and wave plates.

SUMMARY OF THE INVENTION

As opposed to the prior art, the present invention uses three components of Faraday rotation in a material: the magnetic field applied to the material, the Verdet constant of the material and the material length. In one embodiment of the invention, the system spatially disperses a light beam using a dispersive element, assigns a particular material length for each wavelength, and recombines the beam using another dispersive element.

There is provided in accordance with an embodiment of the invention an apparatus including a dispersive-collimating element, a Faraday material apparatus and a focusing-dispersive element such that the dispersive-collimating element assigns each beam wavelength to a particular spatial position, the beams being parallel one to the other, the Faraday material apparatus provides a polarization rotation independently for each wavelength, and the focusing-dispersive element recombines the wavelengths into one single beam.

In one aspect, the Faraday material apparatus includes a Faraday material with a non-zero Verdet coefficient located within a magnetic field so that each wavelength propagates for a different length within the Faraday material so as to generate a polarization rotation that is the same for all the wavelengths.

In one aspect, a shape of the Faraday material is complemented to a rectangular shape by a transparent material with a near-zero Verdet coefficient and index-matched to a refractive index of the Faraday material, so that beams exit in a direction that is parallel to the impinging beam.

In one aspect, a shape of the Faraday material is complemented to a rectangular shape by using a complemented part of the Faraday material, and distanced from the Faraday material by a transparent material with a near-zero Verdet coefficient and index-matched to a refractive index of the Faraday material, and the complemented part is located in a region where the magnetic field is approximately null.

In one aspect, in the dispersive-collimating element there are curved surfaces that are preceded, followed or both preceded and followed by spatially variable birefringent elements so that polarization is not distorted by interaction with the curved surfaces.

In one aspect, a length of the Faraday material is modified for each wavelength.

DETAILED DESCRIPTION

The Faraday effect can be described by the following relationship: $\theta = V(\lambda) B d$, where $\theta$ is the polarization rotation angle, $\lambda$ is the light wavelength, V represents the wavelength dependent Verdet constant, B is the magnetic field and d is the path length of the light in the material.

Figure 1:
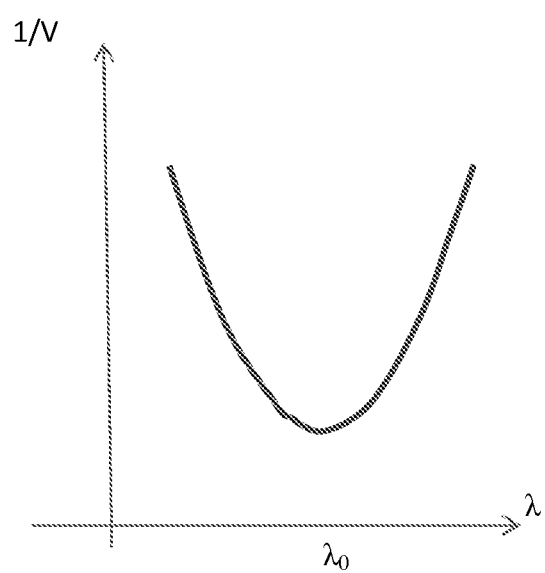
FIG. 1: Typical dependence of the Verdet coefficient on the wavelength. The abscissa is wavelength and ordinate the inverse Verdet coefficient.

Typically, the Verdet constant is related to the light wavelength with the following relation:

$$V(\lambda) = \frac{E}{\lambda^2 - \lambda_0^2}$$

with $\lambda^2 > \lambda_0^2$ where E and $\lambda_0$ are material properties, as shown in FIG. 1. The material is usually strongly absorbing near $\lambda_0$, so practically $\lambda$ is relatively far from $\lambda_0$. Note that this functional representation is used for explanation, but the invention is not limited to this particular form. Any functional dependence can be assumed.

At the condition for which the rotation angle is constant, and equal to $\theta_0$, one obtains the following condition:

$$Bd = K(\lambda^2 - \lambda_0^2)$$

where $K = \theta_0/E$ is a constant. Assuming for now B to be uniform, d depends quadratically on the wavelength.

Figure 2:
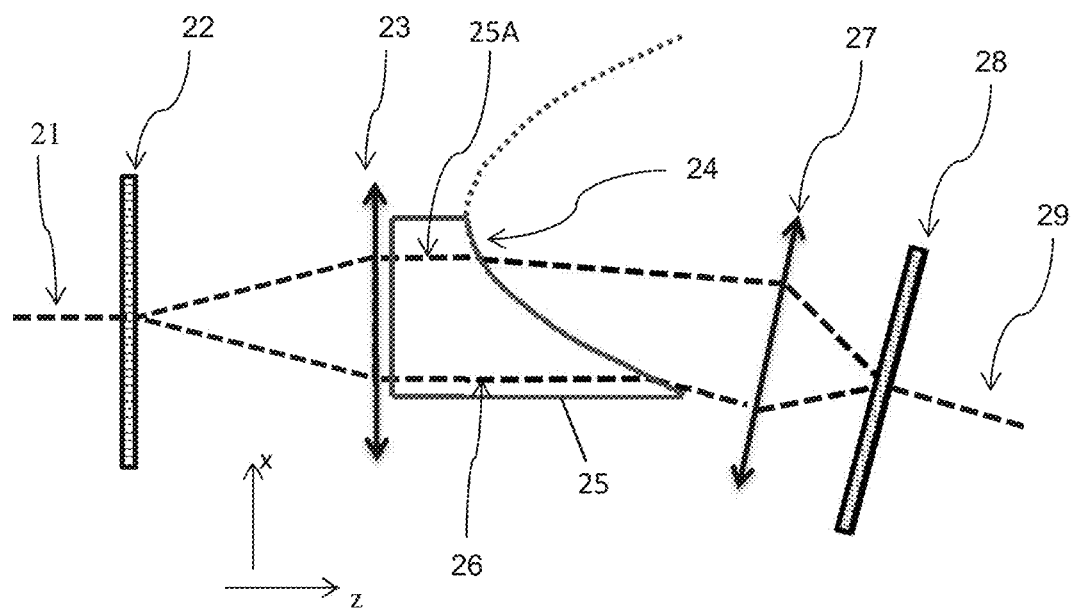
FIG. 2: Description of an embodiment of the invention. A polychromatic beam 21 impinges on a dispersive element 22 to form a dispersed beam. The dispersed beam impinges on a lens 23 that collimates the beam. The beam then propagates within the specially shaped Faraday material 25 that is located in a proper magnetic field. In this drawing the shape is given by a parabola 24. Light then impinges on a lens 27 that focuses the beam to the dispersive element 28 in order to retrieve the initial beam with a rotated polarization.

In reference to FIG. 2, starting with a collimated polychromatic beam 21, light is diffracted by a diffractive element 22, such as a grating, and is collimated using an achromatic cylindrical lens 23. After collimation, wavelengths are linearly related to the coordinate along the x abscissa $\lambda = ax$ (by properly choosing the origin). For example, the shortest wavelength is 25 A and the longest one is 26. The beam then impinges on the Faraday material region whose shape is now described. Assuming a homogeneous magnetic field B, one can assign for each wavelength and therefore each abscissa, a propagation length in the Faraday material given by $$d(x) = \frac{K(a^2x^2 - \lambda_0^2)}{B}$$

By cutting the Faraday material plate according to a parabolic shape 24, as shown in FIG. 2, one obtains a constant rotation angle for each wavelength.

The beam is then reformed using another achromatic cylindrical lens 27 and diffractive element 28.

Implementation 1: The Verdet Coefficient has a Different Functional Shape.

Using the same diffractive element-lens combination as in FIG. 2, one obtains the following generalized expression for the wavelength dependent propagation length:

$$d(x) = \frac{\theta_0}{BV(x, \lambda)}$$

Thus once the wavelength dependent Verdet constant is determined, the cutting of the Faraday material is determined directly.

Implementation 2: The Magnetic Field is not Homogeneous

If the magnetic field is not homogeneous, but its spatial dependence B(x,z) has been measured, then the propagation distance d as a function of x can be calculated as the solution of the following equation:

$$\theta_0 = V(x,\lambda) \int_0^{d(x)} dz B(x,z)$$

Implementation 3: Phase Compensation

Figure 3:
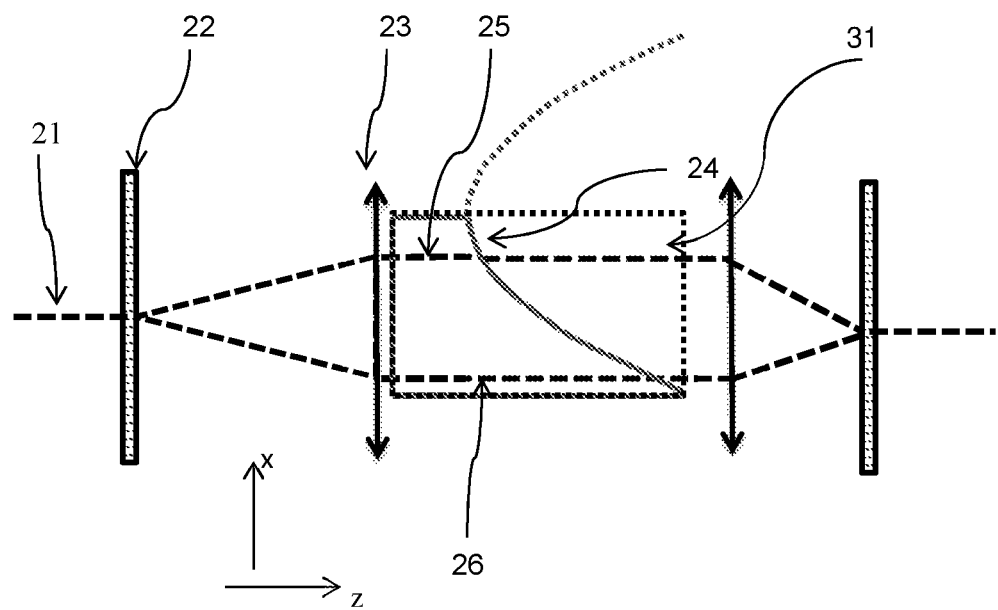
FIG. 3: The same set-up as FIG. 2, except that element 31 is a part that completes the shaped Faraday material 25 to a rectangular plate. Element 31 is index matched to the Faraday material refractive index.

Since the different wavelengths of the beam light propagate in the Faraday material through different path-lengths, they necessarily accumulate different phase-shifts. This can be compensated for by filling the part that has been removed from the rectangular Faraday rotator material plate with a non-Faraday material with the same refractive index, as shown in FIG. 3 (element 31).

Implementation 4: Dispersion Compensation

Figure 4:
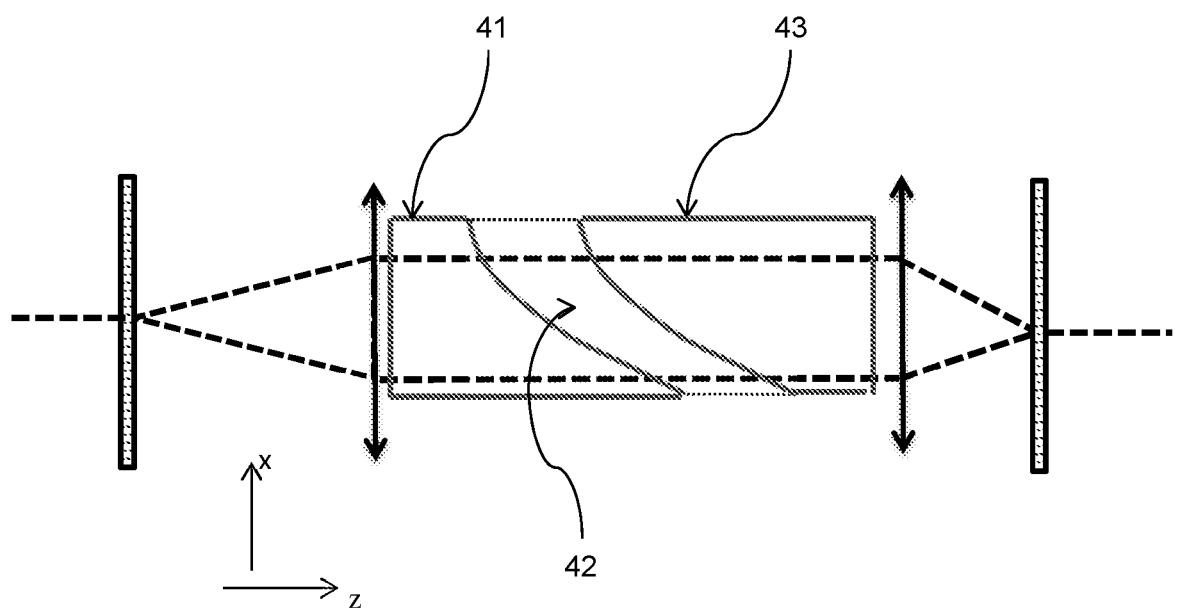
FIG. 4: This figure shows a shaped Faraday material 41, and an index matched transparent material 42 with near-zero Verdet coefficient and near-zero chromatic dispersion. Material 43 is the complementary Faraday material to shaped Faraday material 41. It is from the same material but is not submitted to a magnetic field.

The previous phase compensation scheme is not sufficient, for example, for femtosecond lasers, where the relative phases of each wavelength component of the pulse are critical. FIG. 4 illustrates a combination that allows compensating for dispersion.

Material 41 is the cut Faraday material (as in FIG. 2, element 25), material 42 is an index matched material with minimal Verdet constant and minimal dispersion and material 43 is the complementary of the previous Faraday material (meaning that by adjusting the two parts, one obtains a perfect rectangular plate). Material 41 is subject to the magnetic field B whereas material 43 is not. The purpose of the material 42 region is to distance material 43 from the magnetic region so that the role of material 43 is only to compensate for dispersion and phase.

Implementation 5: The Dispersive Element-Lens Subsystems (Elements 22-23 and 27-28) can be Replaced by a Double Prism Configuration Implementation 6: Polarization Distortion at Surfaces The dispersive elements 22 and 28 generate beams that propagate in different directions (each wavelength corresponds to a different direction). When these beams meet a surface, the beams polarization changes according to Fresnel law (for example if they meet a surface at Brewster angle, only one polarization component is kept). In order to reduce this distortive effect different solutions are provided:

Solution 1: Coating of the surface with a polarization independent antireflection layer (or multilayer) over a large numerical aperture (equal or larger than the beam numerical aperture).

Figure 5:
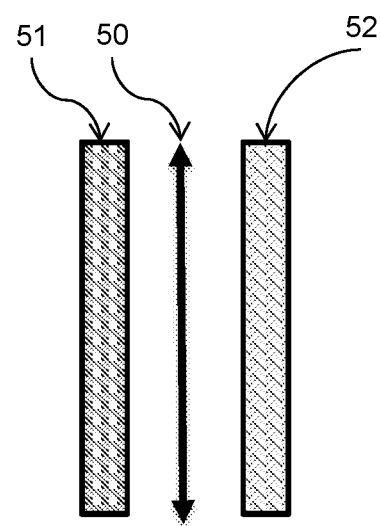
FIG. 5: Element 50 has a variable surface, such as a lens; and plates 51 and 52 are birefringent plates with varying birefringence axes and values, which compensate for the polarization distortion at non-perpendicular surfaces.

Solution 2: As shown in FIG. 5, adding before, after, or both before and after, a birefringent element (phase plate) that is matched to the surface so that it corrects (pre-correction or post-correction or both) the distortive effect. It should be noted that this birefringent element has a variable birefringence (direction and value) along the x axis. However there is no need for achromatic birefringence, since each value of x corresponds to a specific wavelength.

Solution 3: The distortion in the polarization is a second order effect. Therefore by maintaining a small enough angle all over the propagation length, this effect can be minimized.

EXAMPLES

The following table (P. Molina, V. Vasyliev, E. G. Vílora, and K. Shimamura, Opt. Express 19, 11786 (2011)) provides the values of E and $\lambda_0$ for several common Faraday materials. In these examples, TGG (terbium gallium garnet) is the material being considered.

| Crystal | E ($10^3$ rad nm$^2$/Tm) | $\lambda_0$ (nm) |
|---|---|---|
| PrF$_3$ | 45965.3 | 184 |
| CeF$_3$ | 42474.1 | 239 |
| TGG | 44514.9 | 258 |

In reference to FIG. 2, after light is diffracted by the diffractive element 22 the wavelength can be written as:

$$\lambda(x) \approx c_1 x + c_2$$

Assuming that the spectral range of 650-1100 nm is spread over L=3 cm (L is the dimension of 41 in the x direction):

c1=450/L [nm], c2=650 [nm], where x is in cm and $\lambda$ is in nm.

Therefore, the Faraday material length as a function of the position x can be written:

$$d(x) = \frac{\theta}{BV(\lambda)} = \frac{\pi \backslash 4}{BE}((c_1 x + c_2)^2 - \lambda_0^2)$$

Figure 6:
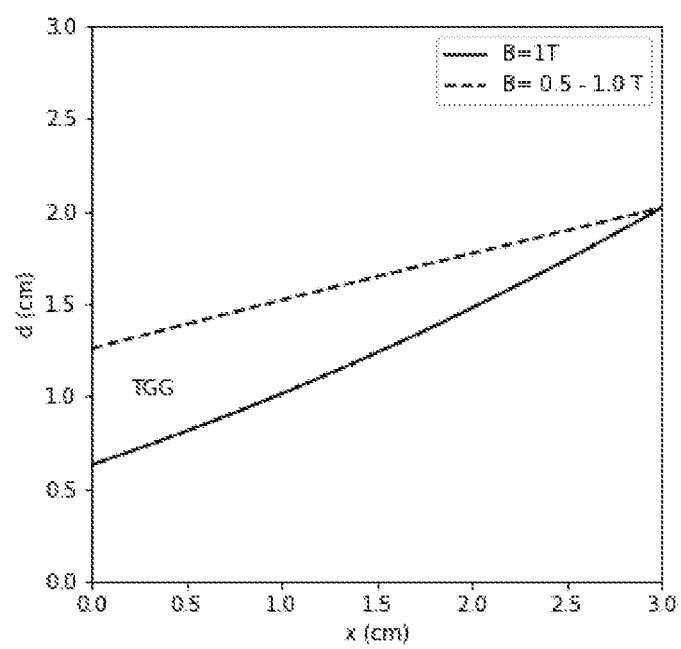
FIG. 6 is a graphical illustration of the Faraday material length d(x) displayed as a function of the position x for uniform magnetic flux (fixed at 0.5 Tesla) and linearly varying magnetic flux (between 0.2 to 0.5 Tesla).

Two different cases are examined: uniform magnetic flux (fixed at 0.5 Tesla) and linearly varying magnetic flux (between 0.2 to 0.5 Tesla) in the x dimension. The Faraday material length d(x) as a function of the position x is displayed in FIG. 6.

The invention claimed is:

1. An apparatus comprising:
   a dispersive-collimating element, a Faraday material apparatus and a focusing-dispersive element such that said dispersive-collimating element assigns each beam wavelength to a particular spatial position, the beams being parallel one to the other, said Faraday material apparatus provides a polarization rotation independently for each wavelength, and said focusing-dispersive element recombines the wavelengths into one single beam, wherein said Faraday material apparatus comprises a Faraday material with a non-zero Verdet coefficient located within a magnetic field so that each wavelength propagates for a different length within the Faraday material so as to generate a polarization rotation that is the same for all the wavelengths, and wherein a shape of the Faraday material is complemented to a rectangular shape by a transparent material with a near-zero Verdet coefficient and index-matched to a refractive index of the Faraday material, so that beams exit in a direction that is parallel to the impinging beam.

2. The apparatus according to claim 1, wherein in said dispersive-collimating element there are curved surfaces that are preceded, followed or both preceded and followed by spatially variable birefringent elements so that polarization is not distorted by interaction with the curved surfaces.

3. The apparatus according to claim 1, wherein a length of the Faraday material is modified for each wavelength.

4. An apparatus comprising:
a dispersive-collimating element, a Faraday material apparatus and a focusing-dispersive element such that said dispersive-collimating element assigns each beam wavelength to a particular spatial position, the beams being parallel one to the other, said Faraday material apparatus provides a polarization rotation independently for each wavelength, and said focusing dispersive element recombines the wavelengths into one single beam, wherein said Faraday material apparatus comprises a Faraday material with a non-zero Verdet coefficient located within a magnetic field so that each wavelength propagates for a different length within the Faraday material so as to generate a polarization rotation that is the same for all the wavelengths, and wherein a shape of the Faraday material is complemented to a rectangular shape by using a complemented part of said Faraday material, and distanced from said Faraday material by a transparent material with a near-zero Verdet coefficient and index-matched to a refractive index of the Faraday material, and said complemented part is located in a region where the magnetic field is approximately null.

5. The apparatus according to claim 4, wherein in said dispersive-collimating element there are curved surfaces that are preceded, followed or both preceded and followed by spatially variable birefringent elements so that polarization is not distorted by interaction with the curved surfaces.

6. The apparatus according to claim 4, wherein a length of the Faraday material is modified for each wavelength.

* * * * *